United States Patent [19]

Goodale, Jr. et al.

[11] Patent Number: 5,519,287
[45] Date of Patent: May 21, 1996

[54] TWO TERMINAL PULSED LOW VOLTAGE INCANDESCENT LAMP DIMMER WITH INCREASED ILLUMINATING EFFICIENCY

[76] Inventors: Garold J. Goodale, Jr., 5507 W. Virginia Ave., Lakewood, Colo. 80226; Herbert W. Behlow, Jr., 1512 Medinah Cir., Lawrence, Kans. 66047; David E. Wilson, 1610 S. Vrain, Denver, Colo. 80219

[21] Appl. No.: 210,600

[22] Filed: Mar. 21, 1994

[51] Int. Cl.$^6$ ................................... H05B 37/00
[52] U.S. Cl. ............... 315/200 A; 315/360; 315/362; 315/241 R; 315/240; 315/DIG. 7
[58] Field of Search .................. 315/DIG. 7, 360, 315/362, 200 A, 241 R, 240

[56] References Cited

U.S. PATENT DOCUMENTS 5,164,636 11/1992 Allaie ..................... 315/200 A

OTHER PUBLICATIONS

Sylvania Miniature Lighting Products Handbook & Catalog, 1974, "Flashing", pp. 15 and 16.

Primary Examiner—Robert J. Pascal
Assistant Examiner—Reginald A. Ratliff
Attorney, Agent, or Firm—J. Preston Oxenham

[57] ABSTRACT

A two terminal pulse width modulated incandescent lamp dimmer using low frequency pulse repetition rate provides increased illuminating efficiency by compensating both for light producing inefficiency of a tungsten filament at dimmed level settings, and for internal resistance of a direct current power source. A preferred embodiment of the dimmer is designed for 3.5 to 9.0 volt operation.

5 Claims, 5 Drawing Sheets

TWO TERMINAL PULSED LOW VOLTAGE INCANDESCENT LAMP DIMMER WITH INCREASED ILLUMINATING EFFICIENCY

BACKGROUND OF THE INVENTION

1. Field of the Invention

This invention relates to the field of lighting controls and more particularly to two terminal, direct current incandescent lamp dimmers used for illumination level and electrical current level control.

2. Description of Prior Art

A number of methods for dimming incandescent lamps have been disclosed and developed for use in automotive, aircraft, marine and other environments for which efficiency claims relate predominantly to the power controlling element and dissipation of energy in the form of heat resulting from unused voltage drop occurring across this element with dimmed lamp controller settings. These methods have adequately provided solutions to reduce such inefficiency which primarily limits the current available without heat sinking and component specifications becoming excessive. The approach generally utilizes a pulse width modulated voltage supply to the lamp(s) at such repetition rate as to emulate a linear, non pulsating direct current of reduced voltage to the lamp(s), effecting a dimmed light output, free from any perceivable flicker or pulsation of intensity, and yet maintain reduced energy dissipation by the controlling device.

These methods address needs basic to illumination control, but consideration of current reduction are secondary in importance. Also, the operating voltage of devices of the prior art is normally in the 10 volt or higher range as is customary to service lamps needing illumination level control, as is the case with instrument panel lighting (U.S. Pat. Nos. 5,113,180, 4,368,406, 4,358,714). And efficiency, although improved, nonetheless is only with respect to component rating; little has been directed toward the objective of optimizing the lumen/watt efficiency, which becomes of importance when dealing with portable or emergency lighting utilizing battery supplies of limited electrical capacity. Furthermore, low voltage direct current dimmers used in two wire configuration have, to our knowledge, not been developed; only in alternating current applications are such disclosed (U.S. Pat. Nos. 4,954,768, 4,876,498).

DISCLOSURE OF THE INVENTION

It is an object of the present invention to maximize efficiencies of incandescent lighting while affording operator controlled reduction of current demand to allow extension of serviceable illumination. It is another object of the present invention to provide lamp dimmer capability for applications in which direct current voltage supply is comparably quite low. It is a further object to effectively and efficiently provide such illumination and current level control. Yet another object of the present invention to provide such a controller of two terminal configuration whereby the convenience of merely wiring the device in series with the power source and lamp any where in the circuit is provided.

Further, it is an object of the present invention to provide a device of simple circuit design; having components which are readily available and economically priced. An additional object is to provide a lamp dimmer having robust and reliable operating characteristics, lending itself to applications in which reliable and extended illumination is paramount.

Accordingly, a dimmer comprising an embodiment of the present invention provides a pulse width modulated dimmer for use with incandescent lamps powered by a direct current power source. The dimmer is capable of a substantial range of illumination and current level control when placed in series with lamp on either the positive or negative side of a DC supply, as long as current polarity is properly maintained through the dimmer. The dimmer is designed for 3.5 to 9 volt operation using an N channel enhancement field effect transistor as the current controlling element. Higher operating voltages are possible by clamping the gate to source voltage as to preclude its exceeding 20 volts. The ratio of the ON/OFF cycling of the FET provides the dimmer control the ON/OFF cycle is provided to be the specified saturation source to drain resistance, minimizing I squared R losses by the FET. A typical value would be 0.12 ohms.

The pulse repetition rate of this cycling is provided to be quite low in accordance with the invention as to afford increased efficiency by two related approaches. First by ensuring that the filament temperature in the bulb cam be kept maximized, increased visible emission by the filament can be developed. By reducing the PRF of the ON/OFF cycle, one can foresee how a point is reached in which, although at a dimmed setting, the ON/OFF cycling of the applied voltage will allow the filament to be fully up to design temperature, or fully OFF. Such would be attended by a strobe like flicker, but by selecting an appropriate PRF, a trade off between maximized efficiency and acceptable levels of flicker can be obtained. One can easily vary the PRF by component selection. For instance, at half current settings a 15 Hz PRF increases measured light output of a HPR 50 halogen bulb by 27% as compared with a 100 Hz PRF at the same current.

In a dimmer comprising a preferred embodiment of the present invention, further efficiency is obtained by addressing the effects of internal resistance associated with many battery power sources. The ON cycle of voltage to the lamp requires an accompanying pulse of current to be supplied by the battery. The internal resistance in the battery will cause a voltage decrease for the duration of the pulse resulting in a reduced filament temperature and thus efficiency. However, by simply placing an appropriate value capacitor in parallel with the battery, considerable restoration to the open circuit battery voltage may be obtained at lower dimmed level settings, providing a markedly improved filament temperature and resulting light output. The battery charges the capacitor during the OFF cycle, and the capacitor plus the battery power the bulb during the ON cycle. In essence, the capacitor averages the pulses of current required from the battery, allowing higher voltage for the the bulb. For example, a 6 volt alkaline battery with 1 ohm internal resistance wired in series with the invention and an HPR 50 bulb measures 10% improvement of efficiency at 50% dimmed settings, and 20% improvement at 70% dimmed setting when the battery is shunt by a 10000 ufd capacitor.

The above and other related objects and advantages of the invention will be apparent from a reading of the following description of the disclosure as illustrated by the accompanying drawings, of which:

DETAILED DESCRIPTION

Figure 1:
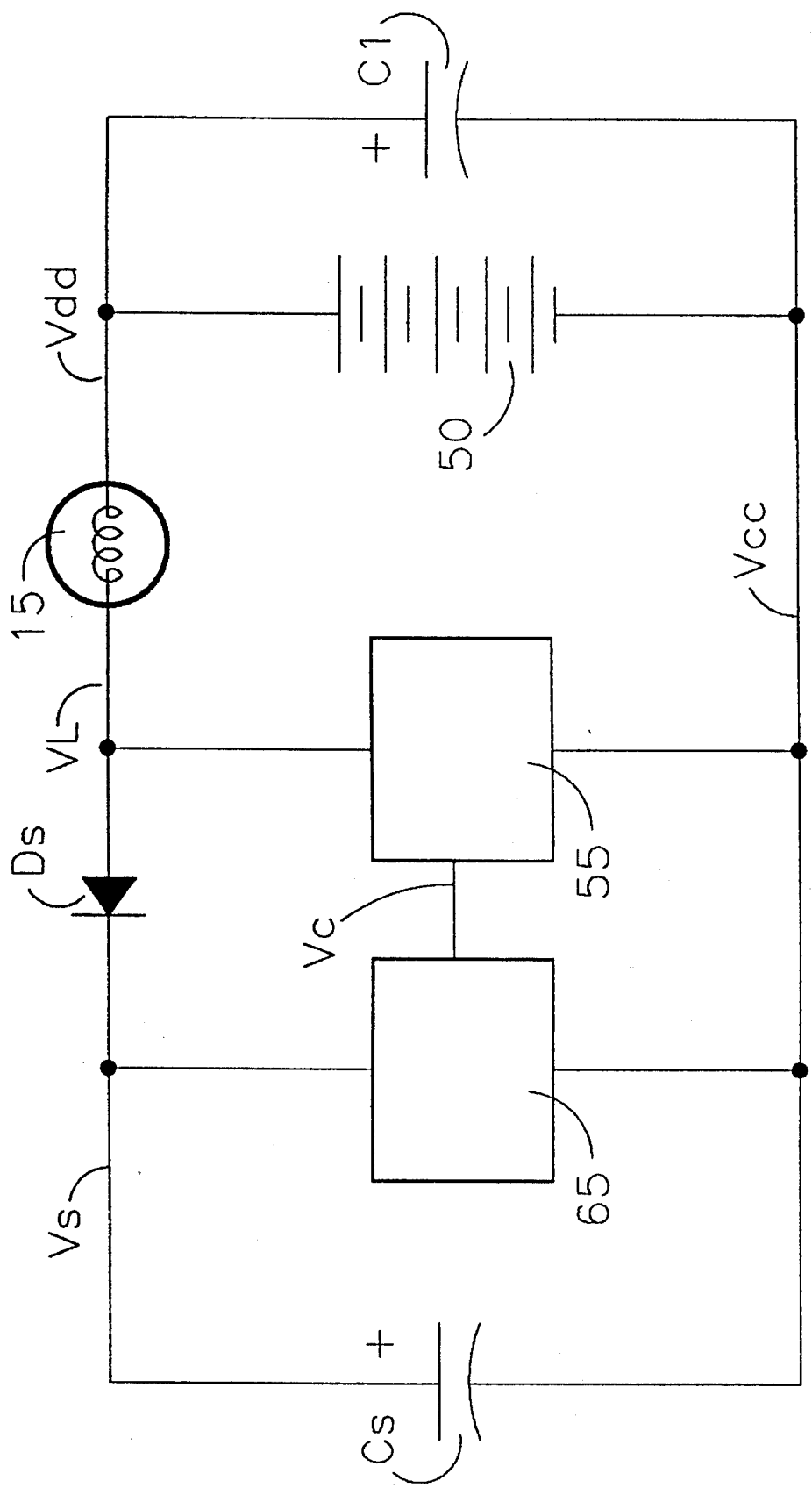
FIG. 1 is a functional block diagram of the invention.

Referring now to FIG. 1 in which the function of the invention as well as the preferred embodiment is outlined, positive direct current from electrical power source (battery 50), with capacitor C1 in electrical circuit parallel, is routed through filament of incandescent lamp (15), interruptedly cycled ON and Off by means of series wired switch (55), said current returned to negative terminal of battery (50) via Vcc. Rate of cycling permits capacitor C1, if of sufficient component value, to charge during OFF cycle by current from battery (50) via its internal resistance Ri, and to discharge during ON cycle, assisting battery (50) to provide increased voltage to incandescent lamp (15), allowing filament to approach design light emissive temperatures, and rendering increased visible light producing efficiency even while at less than full illumination level setting. Supply voltage VL, during OFF cycle, peaks at battery voltage Vdd and is rectified by shottky diode Ds and stored in capacitor Cs at potential Vs; this voltage powers timing device (65); resulting switch control voltage Vc cycles switch (55) to ON and OFF state which ratio affords illumination and current level control by operator adjustment of timing circuit (65).

Figure 2:
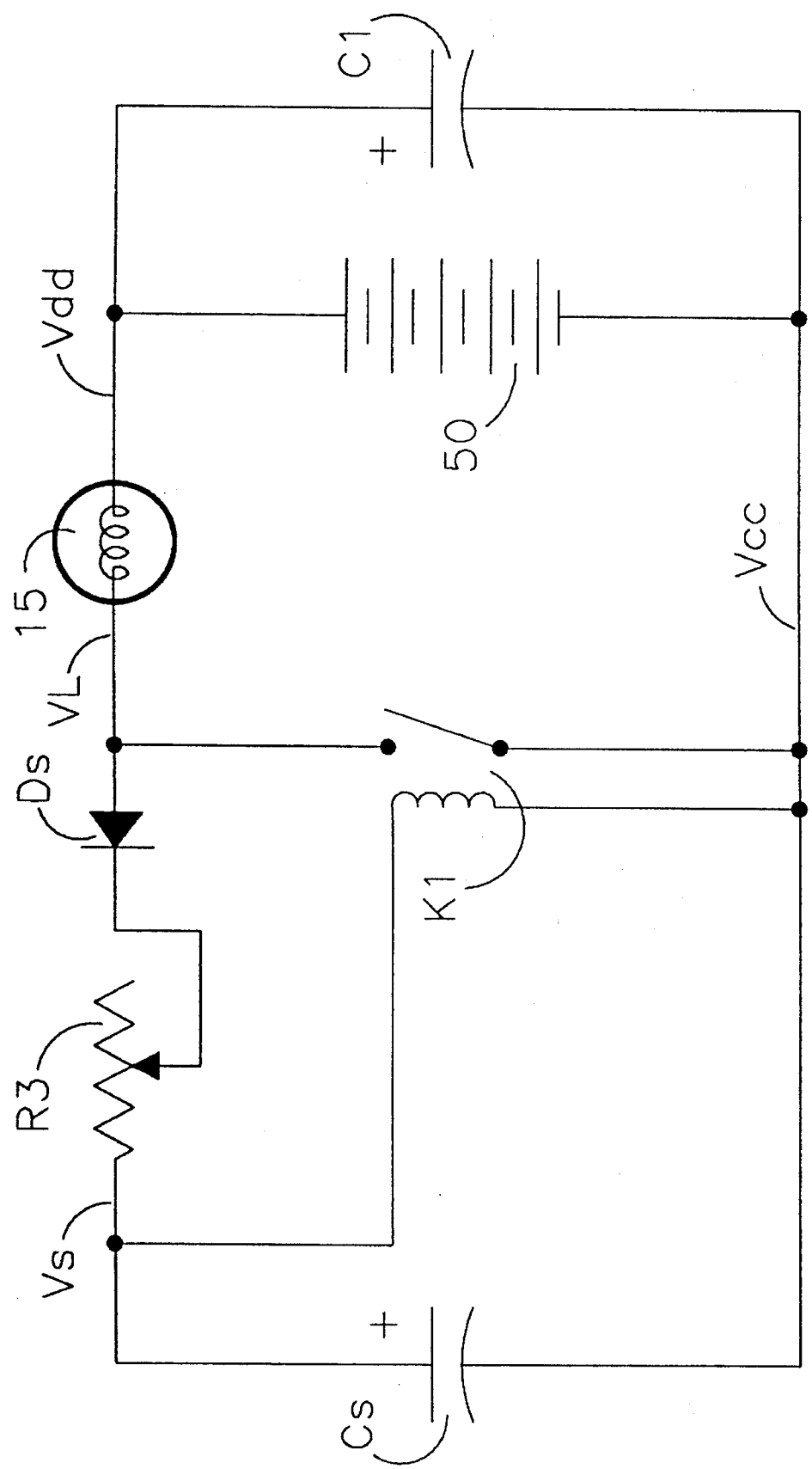
FIG. 2 is a schematic diagram illustrating the function of the preferred embodiment by a electromechanical switch analog.

Next referring to FIG. 2 whereby the basic functioning of the invention may be analogously demonstrated by a reed relay relaxation oscillatory circuit, positive current, as before, is routed from battery (50) through incandescent lamp (15), interruptedly cycled by relay K1, said current returned to negative terminal of battery (50) via Vcc. Shunt capacitor C1 operates as described before. During the OFF cycle, diode Ds conducts as voltage VL attains Vdd. Unlike in FIG. 1, Ds does not quickly charge Cs to Vdd, but does so at a rate of charge determined by operator adjustable potentiometer R3. Upon capacitor Cs attaining the pull in voltage of switch K1, K1 will activate ON cycle, illuminating incandescent lamp (15), resulting in VL becoming zero volts. Capacitor Cs will begin to discharge through solenoid of K1 at a rate determined by its coil resistance, until voltage Vs reaches the release voltage of K1, beginning a new OFF cycle. By varying potentiometer R3, the duration of the OFF cycle is adjustable, affording operator control of the ratio of ON to OFF cycle and thus level control. The capacitance of Cs as well as the coil resistance of K1 determines the repetition rate of cycling. A small permanent magnet in proximity to K1 may also be used to vary the cycling rate and ratio.

Figure 3:
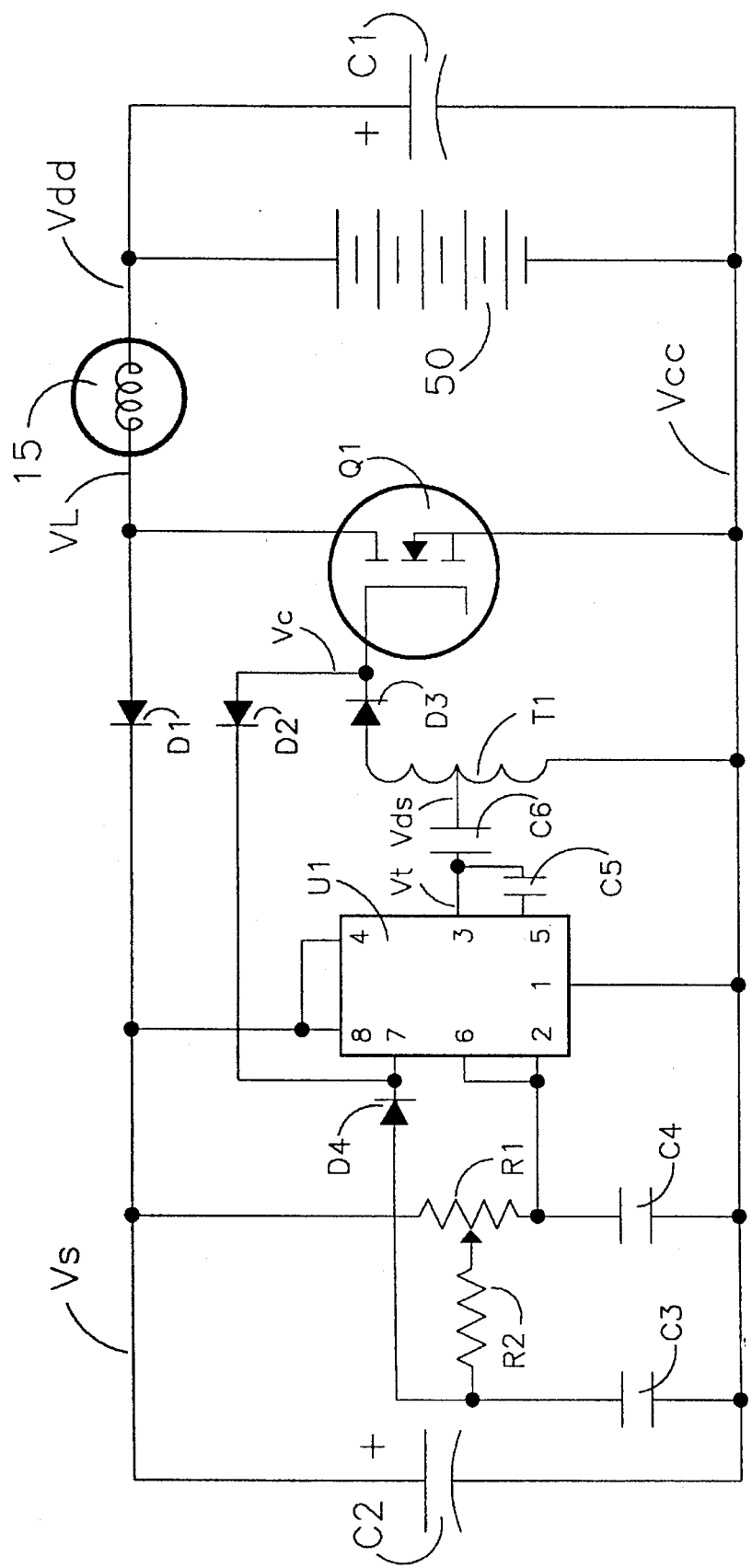
FIG. 3 is a schematic diagram showing a preferred embodiment of the invention.

Referring to FIG. 3 wherein a preferred embodiment of the invention is detailed, again the battery (50) supplied current proceeds from Vdd through lamp (15), switch Q1, returning to battery (50) via Vcc. Shunt capacitor C1 functioning as before. Voltage VL peaks at Vdd during OFF cycle, and as described before, is rectified by shottky diode D1 and stored in capacitor C2 at voltage Vs to power timing I.C. U1. Timing waveform Vt is derived from timing I.C. U1 and associated circuitry C3, C4, R2, R1, C5, and D4. Potentiometer R1 affords operator control of timing waveform Vt and subsequent dimmer control. With the wiper contact of R1 uppermost, connecting the right side of R2 in FIG. 3 to Vs, I.C. U1 is in quiescent state; no waveform Vt is produced. As wiper is moved away from Vs, a discharge path from pin 7 of U1 though D4 and R2 begins to occur, reducing voltage across C4 and pins 8 and 6 of U1. Upon reaching internally set trigger level of U1, timing waveform Vt goes from zero volts to approximately the voltage of Vs. Pin 7 ceases discharge, and C4 begins to charge back up until reaching internally set threshold voltage, whereupon timing waveform returns to zero volts, pin 7 resumes discharging C4 to repeat the timing cycle at a rate selectable by capacitance of C3 and C4. C3 establishes the repetition rate at fuller brightness levels; C4 establishes the rate at dimmer levels. R2 limits the current discharge though D4 to pin 7 during the quiescent state. As wiper of potentiometer R1 is moved from Vs toward junction of C4 and pin 2 and 6 of U1, the ratio of ON to OFF of timing waveform Vt proportionally increases, which, in turn, controls the cycling of switch Q1. C5 establishes a hysteresis for both trigger and threshold inputs, increasing timing stability and allowing operation at lower input voltages.

Figure 4:
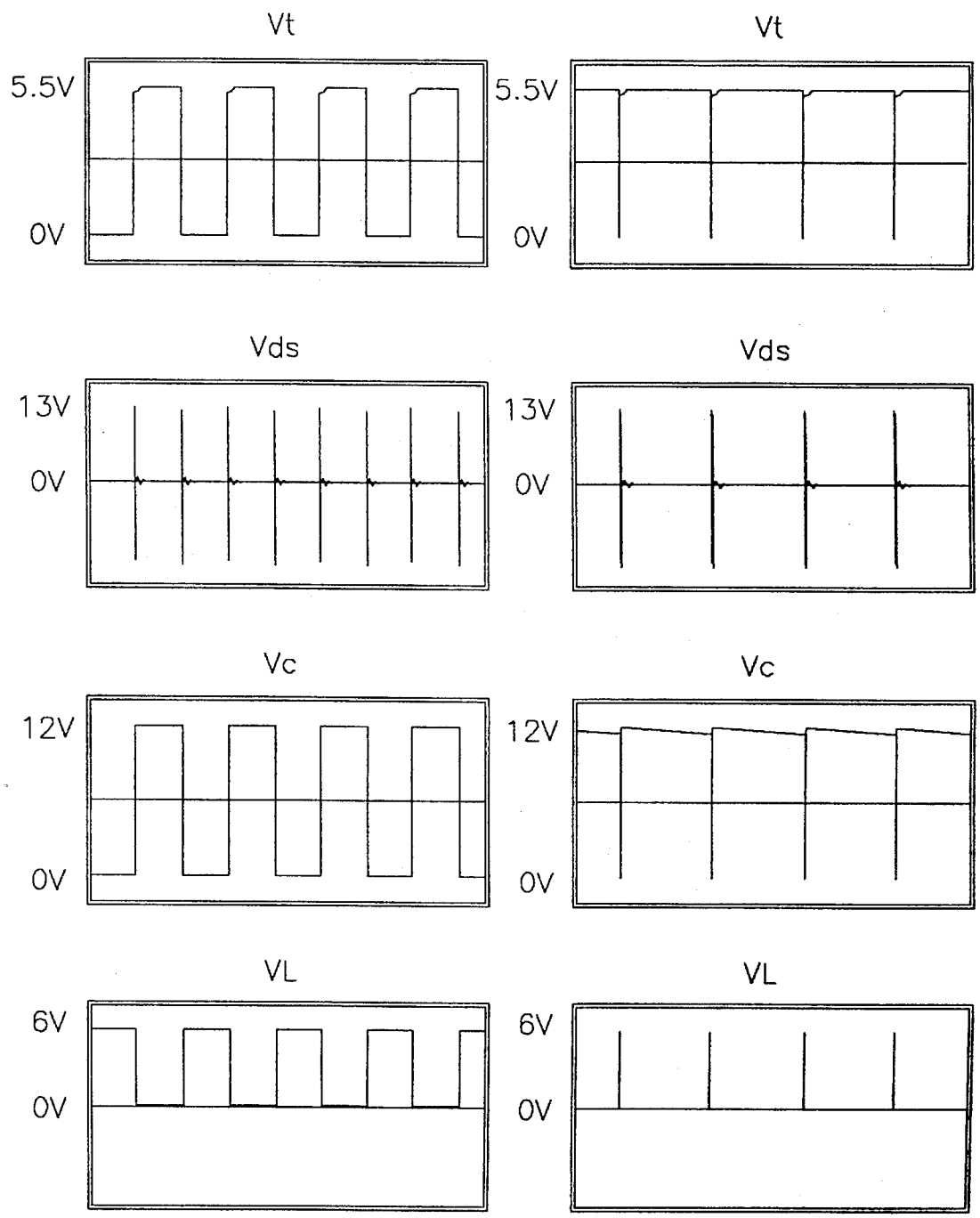
FIG. 4 is a series of waveform diagrams illustrating the operation of the preferred embodiment.
Figure 5:
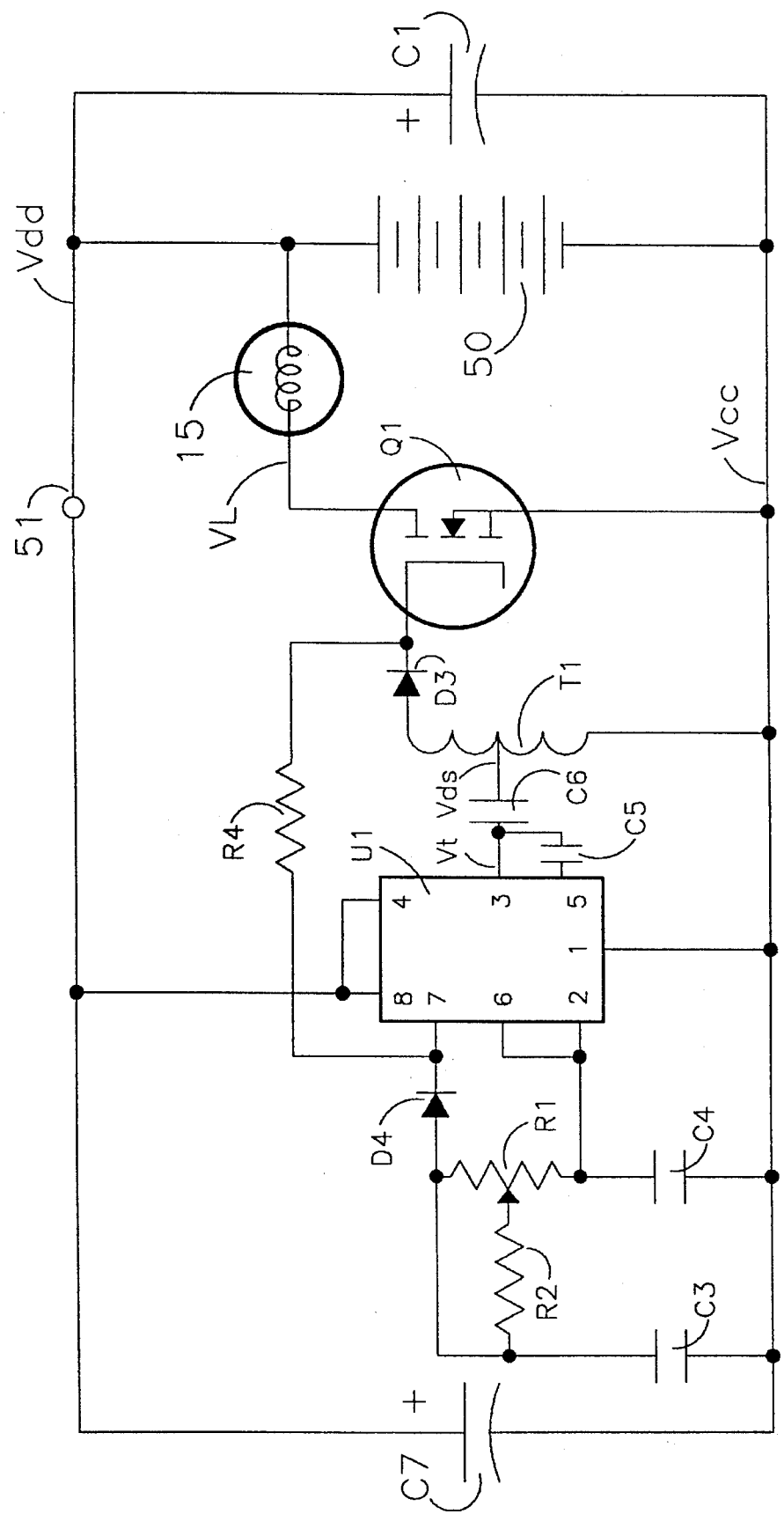
FIG. 5 is a schematic diagram showing an embodiment configured for three terminal operation.

Referring to FIG. 4 as to facilitate analysis of timing waveform control of Switch Q1, positive and negative going timing waveform Vt is differentiated by capacitor C6 and the primary of pulse transformer T1, producing waveform Vds, which is stepped up in voltage by said transformer and rectified by diode D3. This resulting pulse of direct current is charge stored on the gate of the N channel field effect transistor switch to at least two times the voltage of waveform Vt. This voltage persists on the gate for the duration of waveform Vt; the moment Vt returns to zero volts, discharge of this gate charge voltage occurs through diode D2 to logic level of pin 7 of U1. In essence, timing waveform Vt is exactly reproduced on the gate of Q1 at a voltage that ensures source to drain conductive state saturation of this N channel FET switch; waveform VL occurring as Q1 switches ON/OFF at the repetition rate of 15 Hz. One can see how, in FIG. 4, dim setting waveforms compare to bright setting waveforms. Ratio of the OFF/ON cycle affords dimming control. Full operation of the preferred embodiment is provided down to 3.5 volts or less. For applications not requiring two terminal configuration, FIG. 5 depicts an embodiment whereby the timing circuit is directly provided power by a third terminal (51) attached to Vdd. Diode D1 is not required, and capacitor C2 can be replaced by a much smaller bypass capacitor (C7) in that no storage of power is needed. Comparing FIG. 5 to FIG. 3 one can see that in most all other respects the operation is identical to the preferred embodiment with the exception of resistor R4 substituting for diode D2. This permits the FET switch to saturate fully and uninterruptedly at full brightness settings, affording approximately 0.1 volt more to lamp (15) as compared with two terminal operation in which the small off interval of the FET switch Q1 is necessary to provide power to the timing circuit storage capacitor C2 via shottky diode D1.

As it is apparent that many variations and modifications are possible without departing from what we believe are novel concepts of this invention, it is therefore intended that the scope of the invention be limited only by the appended claims.

What we claim is:

1. An incandescent lamp dimmer for use with an electrical power source having an internal resistance comprising:

cycling means for interrupted cycling a supply voltage and resulting current through an incandescent filament;

ratio varying means for varying the ratio of ON cycle to OFF cycle; and, capacitance means for providing a capacitance wired in electrical circuit parallel with the electrical power source.

2. An incandescent lamp dimmer for use with an electrical power source having an internal resistance and an incandescent lamp comprising;
   a timing device controlled switch wired in electrical circuit series with the electrical power source and the incandescent lamp; and,
   means for deriving electrical power for said timing device during the OFF cycle of said electrical circuit series wired controlled switch from the voltage developed in electrical circuit parallel to said controlled switch during said off cycle.

3. An incandescent lamp dimmer for use in electrical circuit series with an electrical power source and an incandescent lamp comprising;
   an N channel field effect transistor switch saturated to full source to drain conductive state during an ON cycle by a positive going wave form of a timing circuit, said Wave form differentiated and stepped up in voltage by a pulse transformer, rectified, the resulting voltage charge stored on the gate of said N channel field effect transistor for the duration of said ON cycle said charge stored voltage discharged via a separate electrical circuit to an appropriate logic level in said timing circuit to cause said N channel Field effect transistor switch to cease source to drain electrical conduction for the duration of the OFF cycle during which the voltage from the electrical power source through the incandescent lamp developed across said N channel field effect transistor is rectified and stored by suitable means to supply electrical power for said timing circuit.

4. An incandescent lamp dimmer as in claim 3 in which said stepped-up voltage is at least two times the voltage of said differentiated wave form.

5. An incandescent lamp dimmer as in claim 1 in which said capacitance means is a capacitor wired directly between a positive and a negative pole of the electrical power source

* * * * *